United States Patent
Belwafa et al.

(10) Patent No.: US 9,566,929 B1
(45) Date of Patent: Feb. 14, 2017

(54) VEHICLE OBLIQUE IMPACT ABSORBING SYSTEM

(71) Applicant: Ford Global Technologies, LLC, Dearborn, MI (US)

(72) Inventors: Jamel E. Belwafa, Ann Arbor, MI (US); Michael Barnhart, Saline, MI (US); Frankie Carney, Romulus, MI (US); Edward Joseph Abramoski, Canton, MI (US); Saied Nusier, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/969,262

(22) Filed: Dec. 15, 2015

(51) Int. Cl.
  *B60R 21/205* (2011.01)
  *B60R 21/231* (2011.01)
(52) U.S. Cl.
  CPC .......... *B60R 21/205* (2013.01); *B60R 21/231* (2013.01); *B60R 2021/23107* (2013.01); *B60R 2021/23161* (2013.01)
(58) Field of Classification Search
  CPC .......... B60R 2021/13123; B60R 2021/23138; B60R 2021/23161; B60R 2021/23107; B60R 21/232; B60R 21/205
  See application file for complete search history.

(56) References Cited

U.S. PATENT DOCUMENTS

| | | | |
|---|---|---|---|
| 3,791,667 A | 2/1974 | Haviland | |
| 5,470,103 A | 11/1995 | Vaillancourt et al. | |
| 6,142,521 A * | 11/2000 | Shephard | B60R 19/00 280/728.1 |
| 7,131,664 B1 * | 11/2006 | Pang | B60R 21/233 280/743.2 |
| 8,297,648 B2 | 10/2012 | Komoll et al. | |
| 9,227,587 B1 * | 1/2016 | Belwafa | B60R 21/205 |
| 2005/0275199 A1 | 12/2005 | Helmstetter | |
| 2007/0296191 A1 | 12/2007 | Brinker | |
| 2009/0001695 A1 * | 1/2009 | Suzuki | B60R 21/231 280/730.2 |
| 2010/0295280 A1 * | 11/2010 | Tomitaka | B60R 21/23138 280/730.1 |

FOREIGN PATENT DOCUMENTS

| | | |
|---|---|---|
| JP | 2006256508 A | 9/2006 |
| JP | 2010201980 A | 9/2010 |
| JP | 201151513 A | 3/2011 |

OTHER PUBLICATIONS

Saeki et al., "A Fundamental Study of Frontal Oblique Offset Impacts", Nissan Motor Co., Ltd., Japan, Paper No. 264 (9 pages).

* cited by examiner

*Primary Examiner* — Drew Brown
(74) *Attorney, Agent, or Firm* — Frank A. MacKenzie; Bejin Bieneman PLC

(57) ABSTRACT

An instrument panel includes a frame, an intermediate airbag supported by the frame in an uninflated position, and a first airbag supported by the frame. The first airbag is disposed in a first direction from the intermediate airbag. The first and intermediate airbags are inflatable to an inflated position. The intermediate airbag includes an extension extending in the first direction in the inflated position.

20 Claims, 10 Drawing Sheets

VEHICLE OBLIQUE IMPACT ABSORBING SYSTEM

BACKGROUND

Automobiles are subject to a variety of crash tests, including standard tests regulated by the National Highway Traffic Safety Administration (NHTSA). For example, these tests may be directed toward oblique impacts, i.e., impacts that occur at an angle of 10-50 degrees relative to a vehicle's trajectory. During the oblique impact, occupants of the vehicle move forward and laterally. As one example of an oblique impact test, a moving cart with a deformable barrier moves at 56 mph and impacts a stationary vehicle at a 15 degree angle with a 35% overlap.

Several types of information are measured during the oblique crash test, including airbag performance, test dummy reaction, etc. One type of measurement are the Brain Injury Criteria (BrIC) values during the oblique impact. The BrIC values characterize occupant movement. There remains an opportunity to design a system to absorb crash energy during the oblique impact.

DETAILED DESCRIPTION

Figure 1:
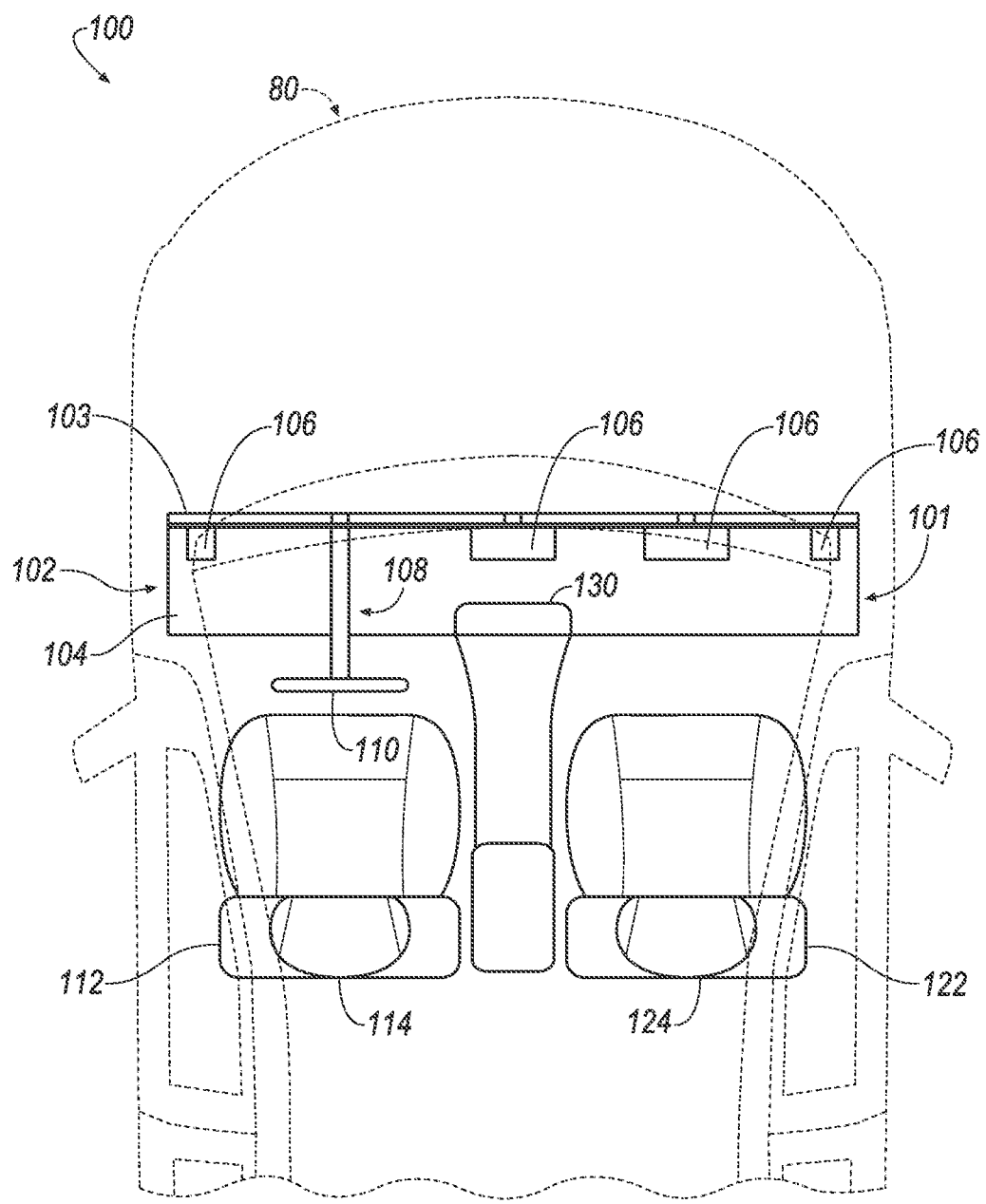
FIG. 1 is a plan view of a vehicle including a first embodiment of an impact absorbing system with airbags of the impact absorbing system in an uninflated position.

With reference to the Figures, wherein like numerals indicate like parts throughout the several views, an instrument panel assembly 101, 201 of a vehicle 80 includes an instrument panel 102, 202 having a frame 103 and a covering 104. A first airbag 10 is supported by the frame 103.

A second airbag 20 is supported by the frame 103 and is spaced from the first airbag 10. An intermediate airbag 30, 230, 330 is supported by the frame 103 between the first and second airbags 10, 20. The first, second, and intermediate airbags 10, 20, 30, 230, 330 are inflatable to an inflated position as shown in FIGS. 2 and 3B-7. The intermediate airbag 30, 230, 330 may extend from the first airbag 10 to the second airbag 20 in the inflated position.

Figure 5:
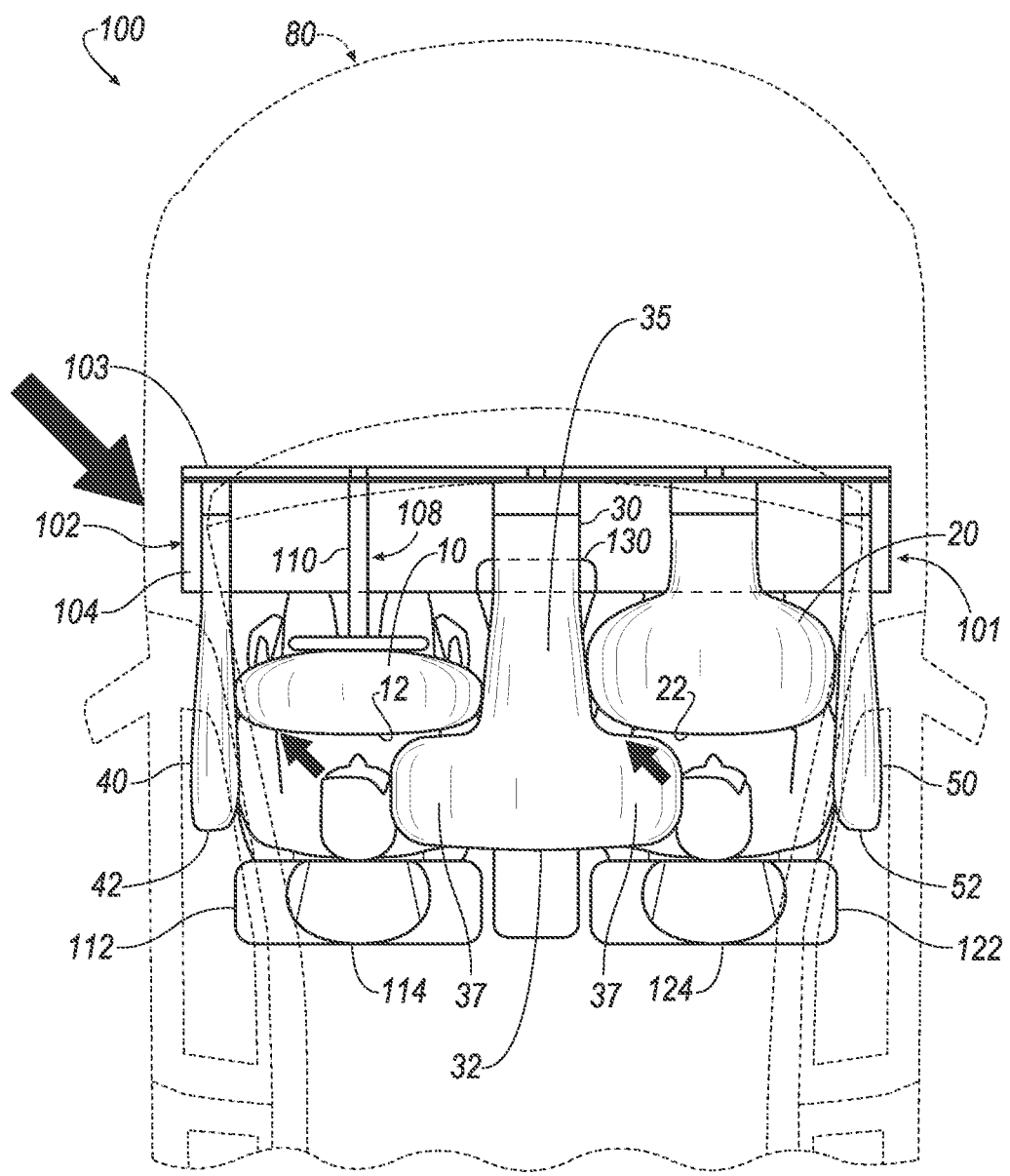
FIG. 5 is a plan view of the first embodiment of the impact absorbing system during an oblique impact from a left side of the vehicle.
Figure 6:
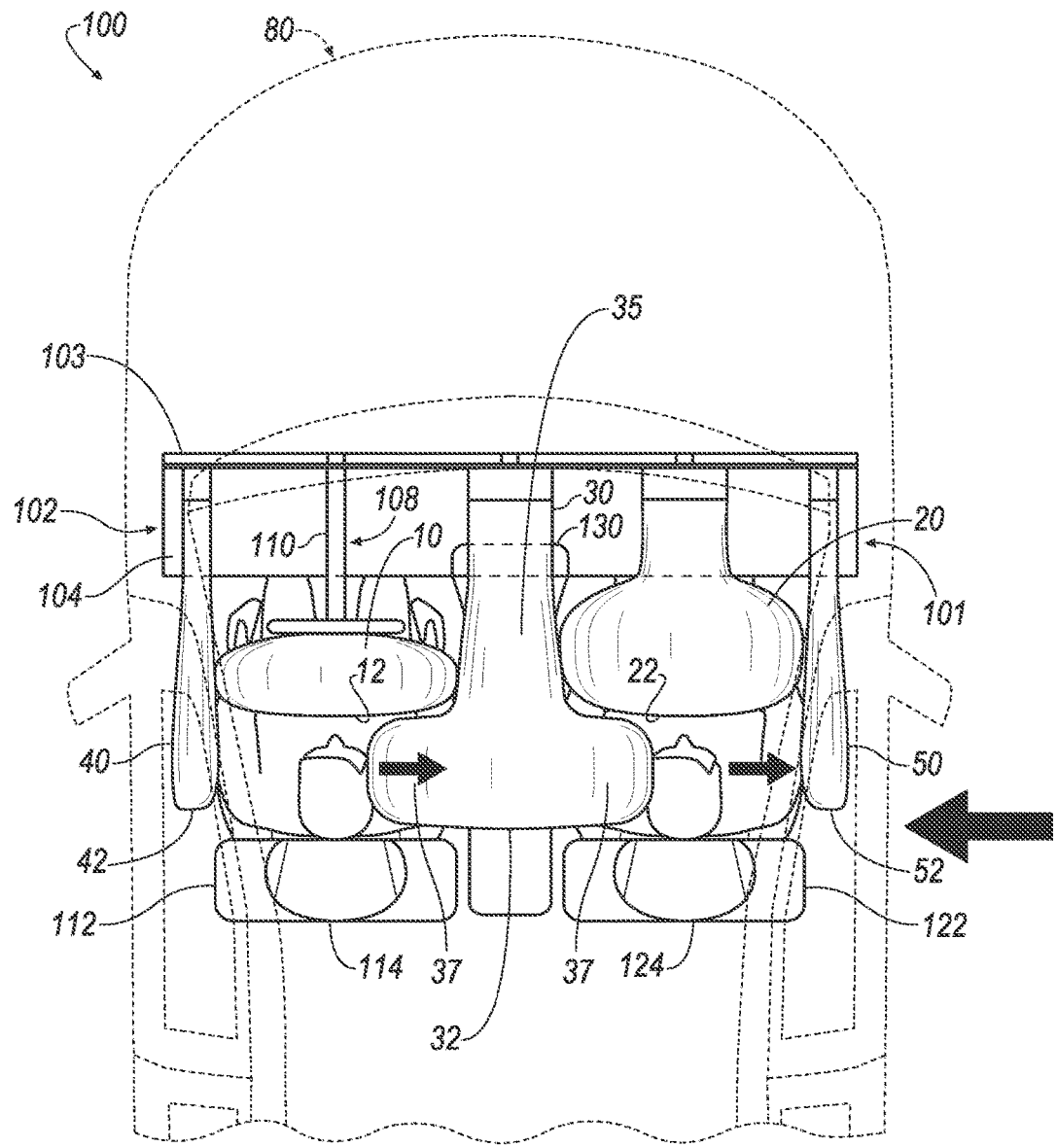
FIG. 6 is a plan view of the first embodiment of the impact absorbing system during a side impact.
Figure 7:
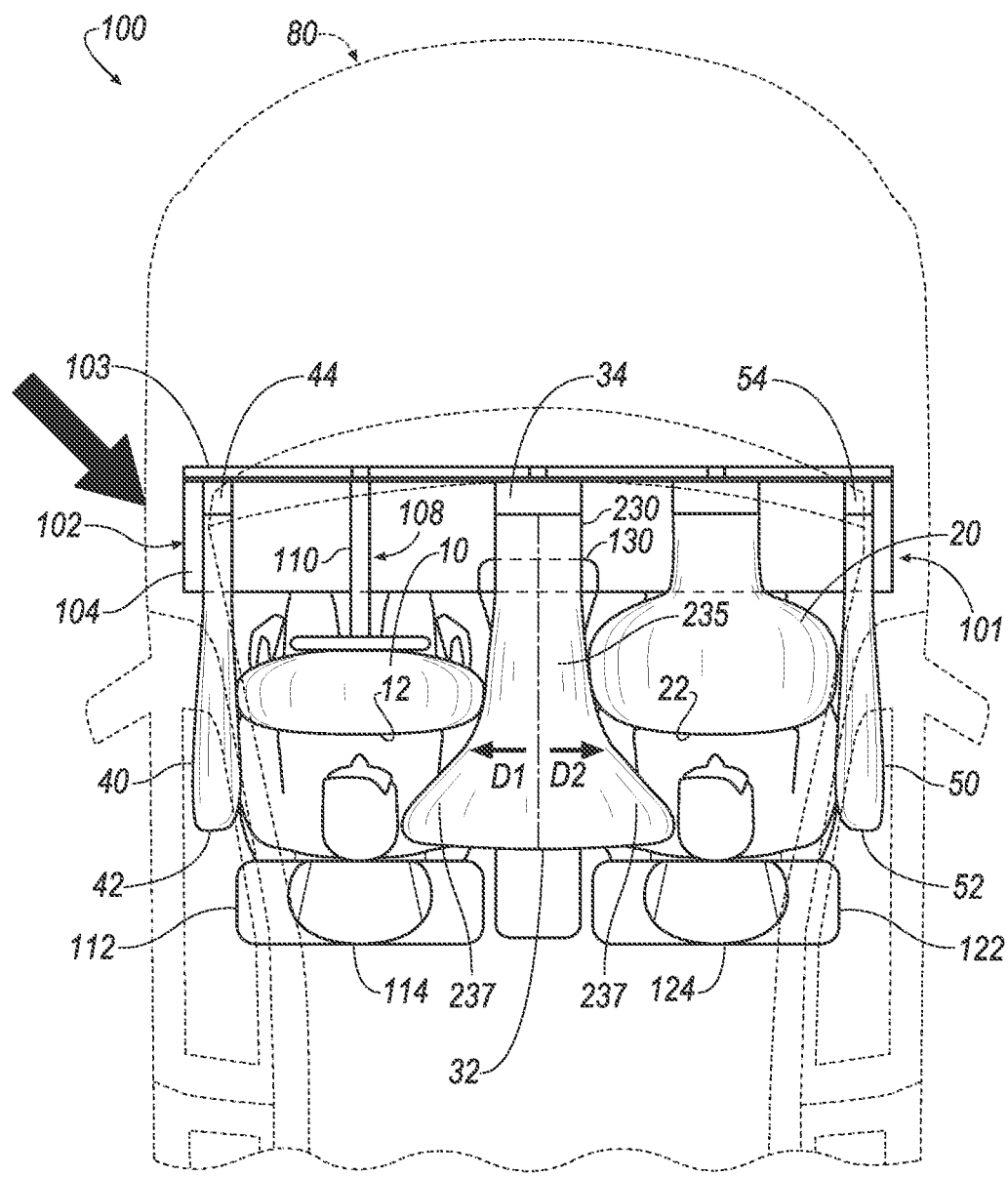
FIG. 7 is a plan view of a second embodiment of the impact absorbing system with the airbags in the inflated position.
Figure 8:
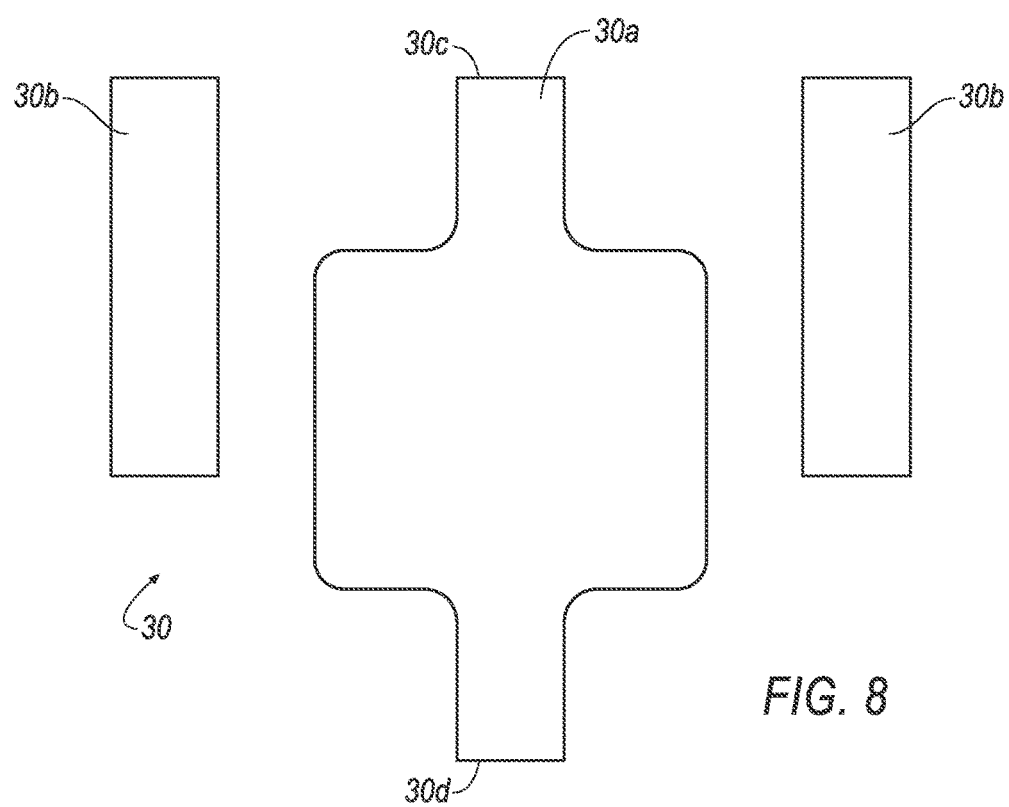
FIG. 8 is an exploded view of panels of an intermediate airbag of the first embodiment of the impact absorbing system.
Figure 9:
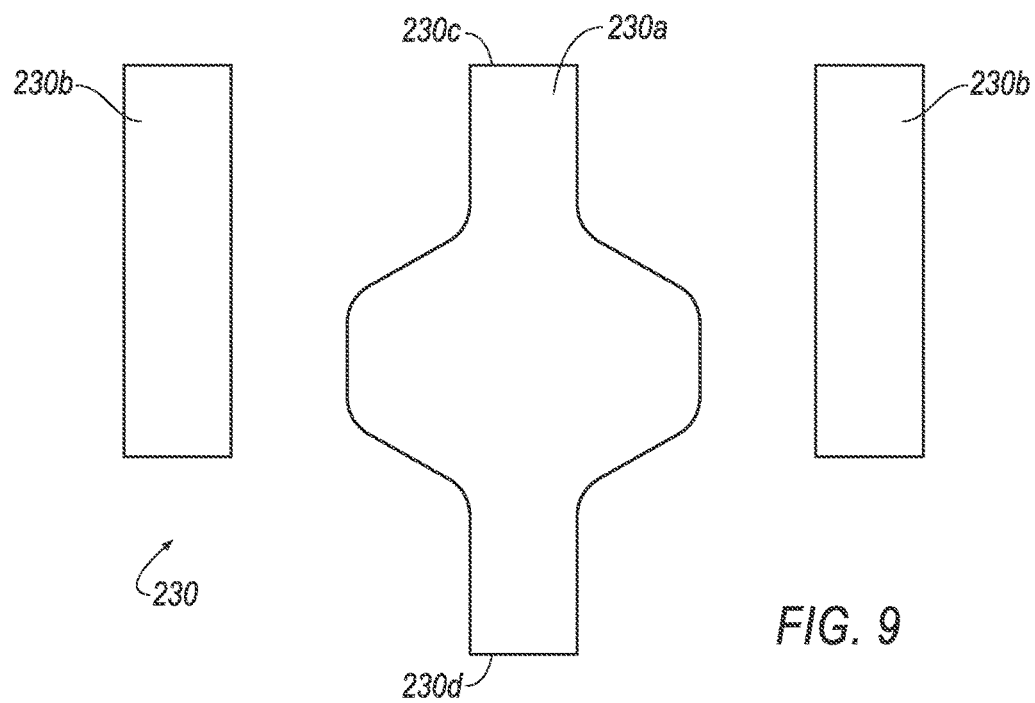
FIG. 9 is an exploded view of panels of an intermediate airbag of the second embodiment of the impact absorbing system.
Figure 10:
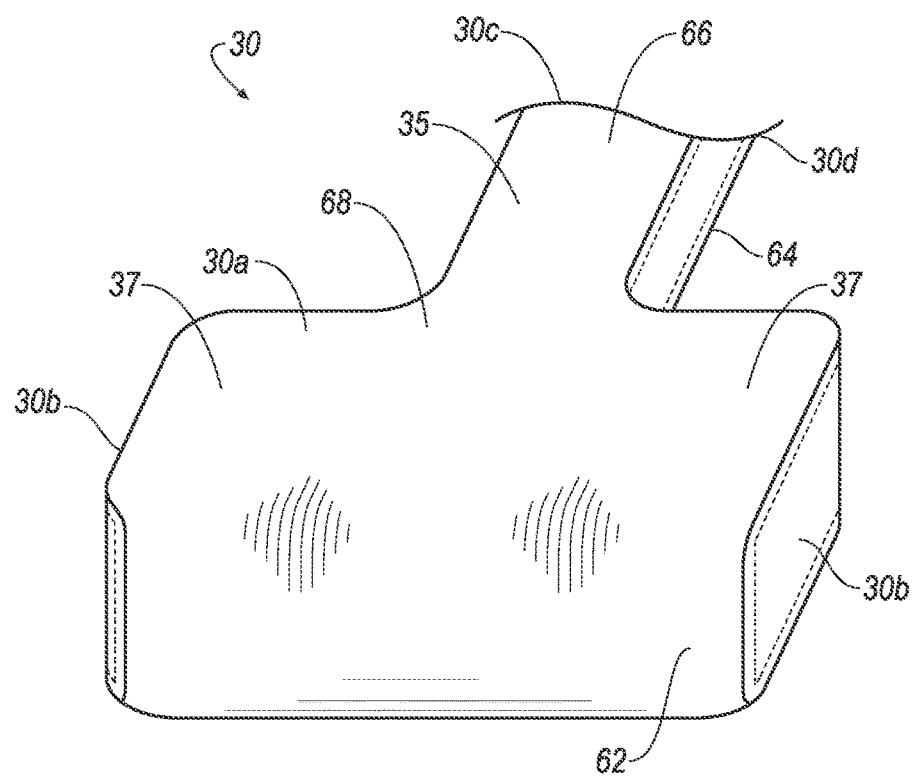
FIG. 10 is a perspective view of a first embodiment of the intermediate airbag in the inflated position.
Figure 11:
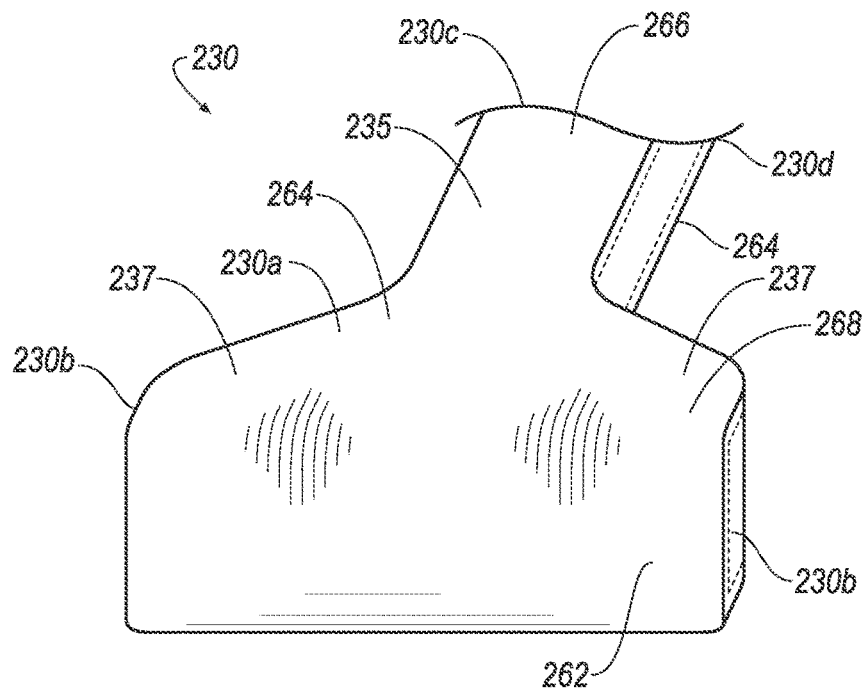
FIG. 11 is a perspective view of a second embodiment of the intermediate airbag in the inflated position.
Figure 12:
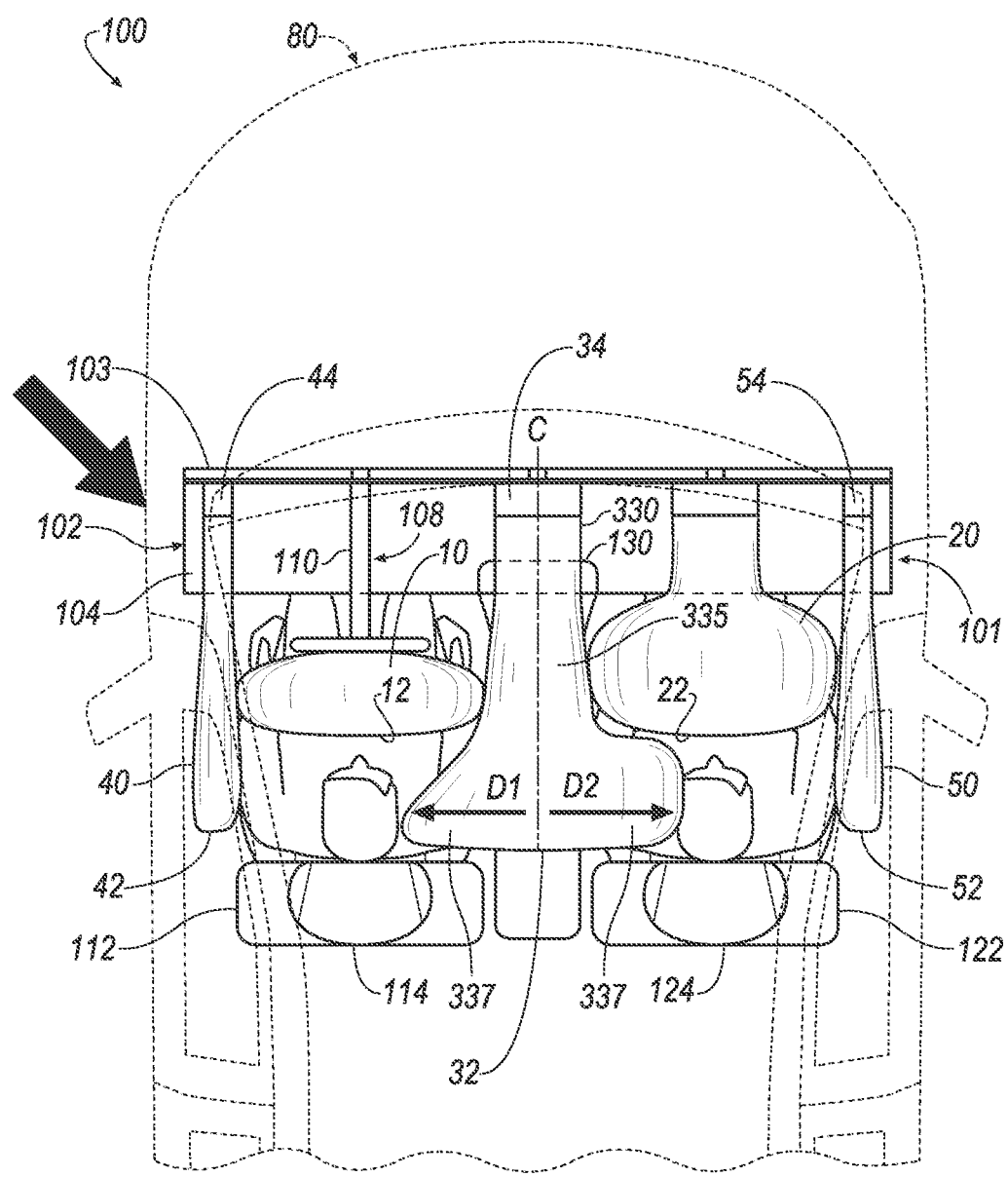
FIG. 12 is a plan view of a third embodiment of the intermediate airbag in the inflated position.

A first embodiment of an intermediate airbag 30, for example, is shown in FIGS. 1-6, 8, and 10, a second embodiment of the intermediate airbag 230 is shown in FIGS. 7, 9, and 11, and a third embodiment of the intermediate airbag 330 is shown in FIG. 12. Common numerals are used to identify common parts in the first and second embodiments 30, 230, 330.

Figure 3A:
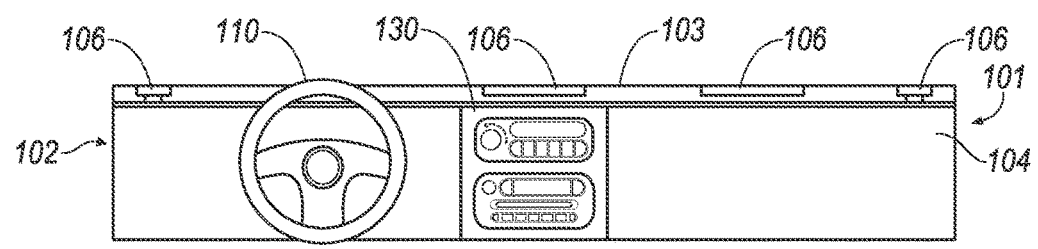
FIG. 3A is a front view of a first embodiment of an instrument panel of the vehicle including the airbags in the uninflated position.
Figure 3B:
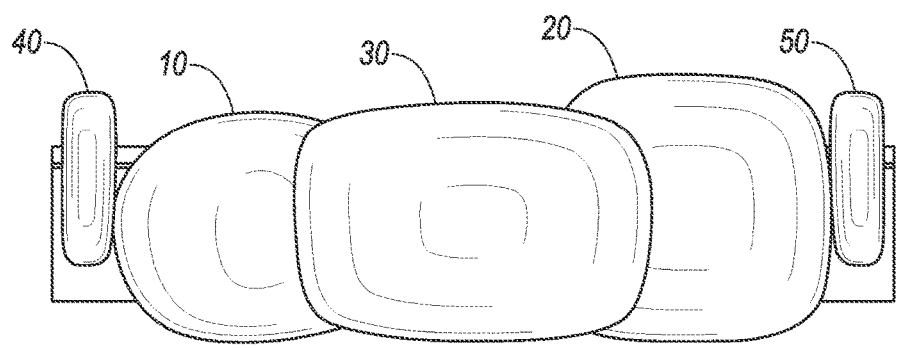
FIG. 3B is a front view of the first embodiment of the instrument panel with the airbags in the inflated position.

During an oblique impact, occupants of the vehicle 80 may move both forward and laterally relative to the vehicle 80. The direction of the impact determines how occupants move within the vehicle 80 during the vehicle impact; in particular, oblique and side impacts cause occupants to move in a lateral direction. The intermediate airbag 30, 230, 330 is positioned to absorb energy from occupants and control the head kinematics during lateral movement. Upon vehicle impact, the first airbag 10, second airbag 20, and the intermediate airbag 30, 230, 330 deploy from an uninflated position, as shown in FIGS. 1 and 3A, to the inflated position to receive the occupants.

The vehicle 80 includes an instrument panel assembly 101, 201. The instrument panel assembly 101, 201 includes the instrument panel 102, 202, the airbags 10, 20, 30, 230, 330, and, as set forth further below, a steering assembly 108.

The frame 103 of the instrument panel 102, 202 is mounted to a component of the vehicle 80, e.g., the body of the vehicle 80. The frame 103 supports the covering 104 and various vehicle components. The frame 103 may be constructed of metal, plastic, and/or any other suitable material.

The covering 104 may be constructed of vinyl, plastic, foam, and/or any other suitable material. The covering 104 may be constructed to provide an aesthetic appearance to the instrument panel 102, 202.

The instrument panel 102, 202 may include panels 106 covering the second airbag 20 and the intermediate airbag 30, 230, 330. Specifically, the covering 104 of the instrument panel 102, 202 may define cutouts (not shown) adjacent to the second airbag 20 and the intermediate airbag 30, 230, 330 and the panels 106 may be releasably fixed to the covering 104 such that the second and intermediate airbags 20, 30, 230, 330 may displace the panels 106 through the cutouts during inflation. The panels 106 may be frangibly connected to the covering 104, such as a friction fit, an adhesive, and/or other suitable configuration. The panels 106 may be attached in any manner that allows the second airbag 20 and the intermediate airbag 30, 230, 330 to expand into the inflated position, e.g., with a hinge and/or tethers, etc. The panels 106 may be constructed of the same material as the covering 104 in a manner to match the aesthetic appearance of the covering 104.

As shown in FIGS. 1, 2, and 4-7, the steering assembly 108 may include a steering column (not shown) and a steering wheel 110 supported on the steering column. The steering column may be mounted to the frame 103 of the instrument panel 102, 202 in any suitable fashion. The steering wheel 110 may be of any suitable configuration. The first airbag 10 may be supported within the steering wheel 110 to absorb energy from a driver of the vehicle 80.

The instrument panel assembly 101, 201 may include a control cluster 130. The control cluster 130 may also be mounted to the frame 103. Specifically, the intermediate airbag 30, 230, 330 may be mounted to the frame 103 of the instrument panel 102, 202 above the control cluster 130. The control cluster 130 may include devices such as a radio, climate controls, and a navigation system. The intermediate airbag 30, 230, 330 may be disposed above the control cluster 130. The control cluster 130 may be located between a first front seat 112 and a second front seat 122 of the vehicle 80.

The instrument panel assembly 101, 201 may include a first airbag module 14. The first airbag module 14 may include a first box (not shown), a first inflator 16, and the first airbag 10. The first airbag module 14 may be supported by the frame 103 of the instrument panel 102, 202. The first airbag module 14 may be supported by the steering assembly 108. When the first airbag 10 is in the inflated position, the first airbag 10 has an end 12 spaced distal relative to the instrument panel 102, 202. The driver may contact the end 12 when the driver moves forward during vehicle impact. The first airbag 10 may be constructed of fabric and/or any other suitable material.

The instrument panel assembly 101, 201 may include a second airbag module 24. The second airbag module 24 may include a second box (not shown), a second inflator 26, and the second airbag 20. The second airbag module 24 may be supported by the frame 103 of the instrument panel 102, 202. When the second airbag 20 is in the inflated position, the second airbag 20 has an end 22 spaced distal relative to the instrument panel 102, 202. The passenger may contact the end 22 of the second airbag 20 when the passenger moves forward during vehicle impact. The second airbag 20 may be constructed of fabric and/or any other suitable material.

The instrument panel assembly 101, 201 may include an intermediate airbag module 34, 234. The intermediate airbag module 34, 234 may include an intermediate box (not shown), an intermediate inflator 36, and the intermediate airbag 30, 230, 330 in the uninflated position. The intermediate airbag module 34, 234 may be supported by the frame 103 of the instrument panel 102, 202. The intermediate airbag 30, 230, 330 has an end 32, 232 spaced distal relative to the instrument panel 102, 202. The intermediate airbag 30, 230, 330 may be constructed of fabric and/or any other suitable material.

The instrument panel assembly 101, 201 may include a first side airbag module 44. The first side airbag module 44 includes a first side box (not shown), a first side inflator 46, and a first side airbag 40 in the uninflated position. The first side airbag module 44 may be supported by the frame 103 of the instrument panel 102, 202. The first airbag 10 is between the first side airbag 40 and the intermediate airbag 30, 230, 330. The first side airbag 40 may be disposed on the left side of the vehicle 80, i.e., the driver side of the vehicle 80. The first side airbag 40 allows for energy absorption during the oblique impact that moves the driver away from the intermediate airbag 30, 230, 330, e.g., when the driver moves diagonally away from the intermediate airbag 30, 230, 330, such as in FIG. 5. The first side airbag 40 may be covered by one of the panels 106 as described above.

Figure 4:
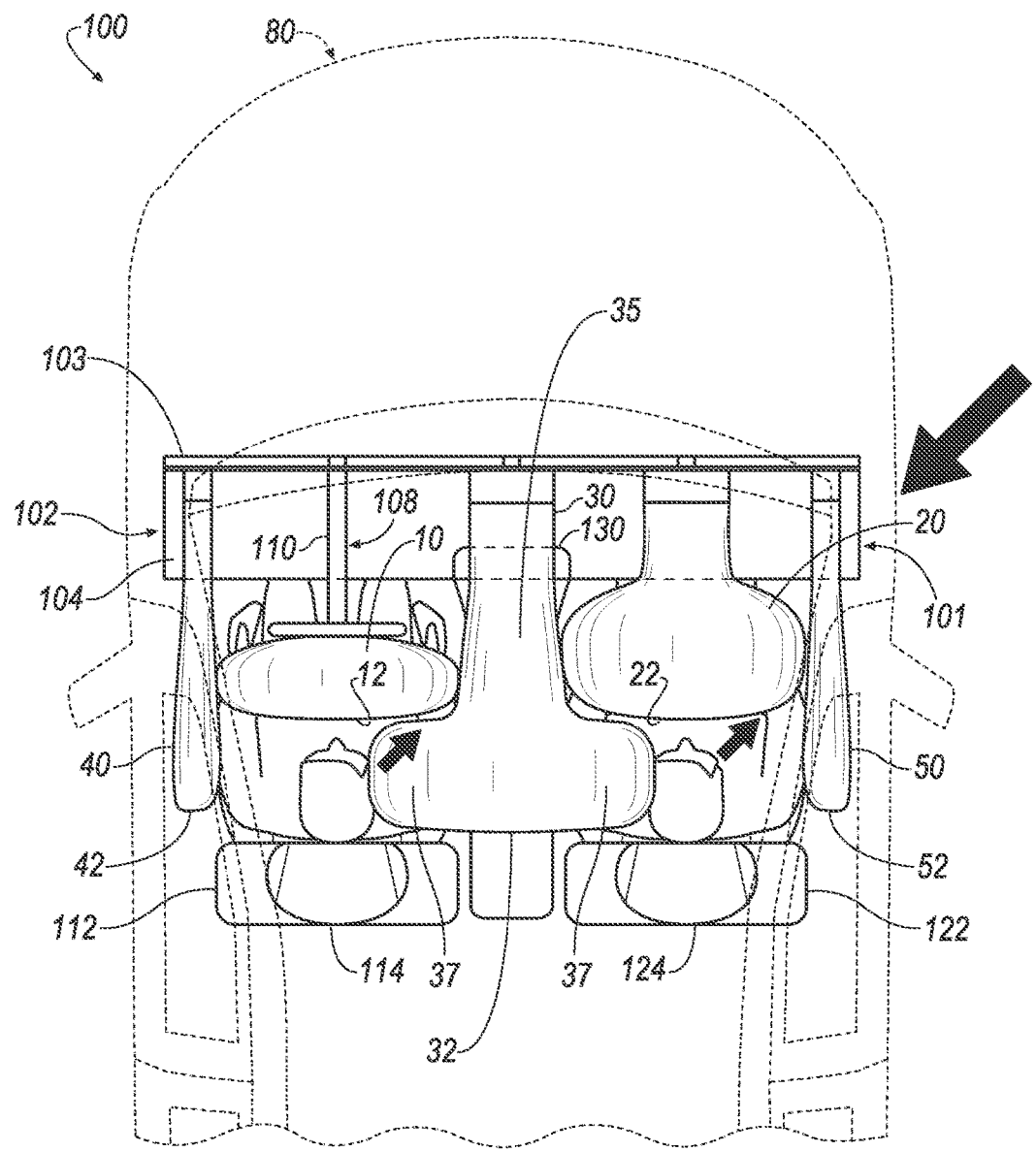
FIG. 4 is a plan view of the first embodiment of the impact absorbing system during an oblique impact from a right side of the vehicle.

The instrument panel assembly 101, 201 may include a second side airbag module 54. The second side airbag module 54 includes a second side box (not shown), a second side inflator 56, and a second side airbag 50 in the uninflated position. The second side airbag module 54 may be supported by the frame 103 of the instrument panel 102, 202. The second airbag 20 is between the second side airbag 50 and the intermediate airbag 30, 230, 330. The second side airbag 50 may be disposed on the right side vehicle 80, i.e., the passenger side of the vehicle 80. The second side airbag 50 allows for energy absorption during the vehicle impact that moves the passenger away from the intermediate airbag 30, 230, 330. The second side airbag 50 may operate in conjunction with the first side airbag 40 to absorb energy from occupants during vehicle impact from several directions. For example, as shown in FIG. 4, when the oblique impact moves the passenger away from the intermediate airbag 30, the second side airbag 50 will receive the passenger. The second side airbag 50 may be covered by one of the panels 106. In addition to, or in the alternative to the first side airbag 40 and the second side airbag 50, the vehicle 80 may include side curtain airbags (not shown), seat mounted side airbags, door mounted side airbags, and/or an A-pillar side airbag.

The boxes of the airbag modules 14, 24, 34, 234, 44, 54 may be of any suitable type and construction, e.g., a rigid polymer, a metal, or a combination of rigid materials. The boxes may be mounted to the frame 103 and/or the covering 104 to advantageously allow the airbags 10, 20, 30, 230, 330, 40, 50 to deploy into the inflated position and to account for packaging space. The boxes may be configured to house the airbags 10, 20, 30, 230, 330, 40, 50 in the uninflated position and support the airbags 10, 20, 30, 230, 330, 40, 50 in the inflated position.

The inflators 16, 26, 36, 46, 56 may be of any suitable type, e.g., cold gas inflators. The inflators 16, 26, 36, 46, 56 may be disposed in the boxes of the airbag modules 14, 24, 34, 234, 44, 54.

As shown in FIGS. 2 and 4-7, upon vehicle impact, the first airbag 10, the second airbag 20, the intermediate airbag 30, 230, 330, the first side airbag 40 and the second side airbag 50 inflate into the inflated position and force the panels 106 open. A windshield 60 of the vehicle 80 may be a reaction surface. In other words, the windshield 60 may be angled relative to the instrument panel 102, 202 and may direct the airbags 10, 20, 30, 230, 330, 40, 50 into the vehicle 80 during inflation.

An impact absorbing system 100 of the vehicle 80 may include the instrument panel 102, the first front seat 112, and the second front seat 122. Specifically, the first front seat 112 may include a first seat back 114 and the second front seat 122 may include a second seat back 124 spaced from the first seat back 114.

As shown in FIGS. 2 and 4-7, the end 32 of the intermediate airbag 30 may be spaced farther from the instrument panel 102 than the end 12 of the first airbag 10 or the end 22 of the second airbag 20. By extending farther from the instrument panel 102, the intermediate airbag 30 can receive occupants during vehicle impact from multiple directions, e.g., lateral motion during the oblique impact or side impact.

With reference to FIGS. 4-7, the intermediate airbag 30, 230, 330 includes a base portion 35, 235 and extensions 37, 237, 337. The base portion 35, 235 extends from the instrument panel 102 and may be disposed between the first and second airbags 10, 20.

Figure 2:
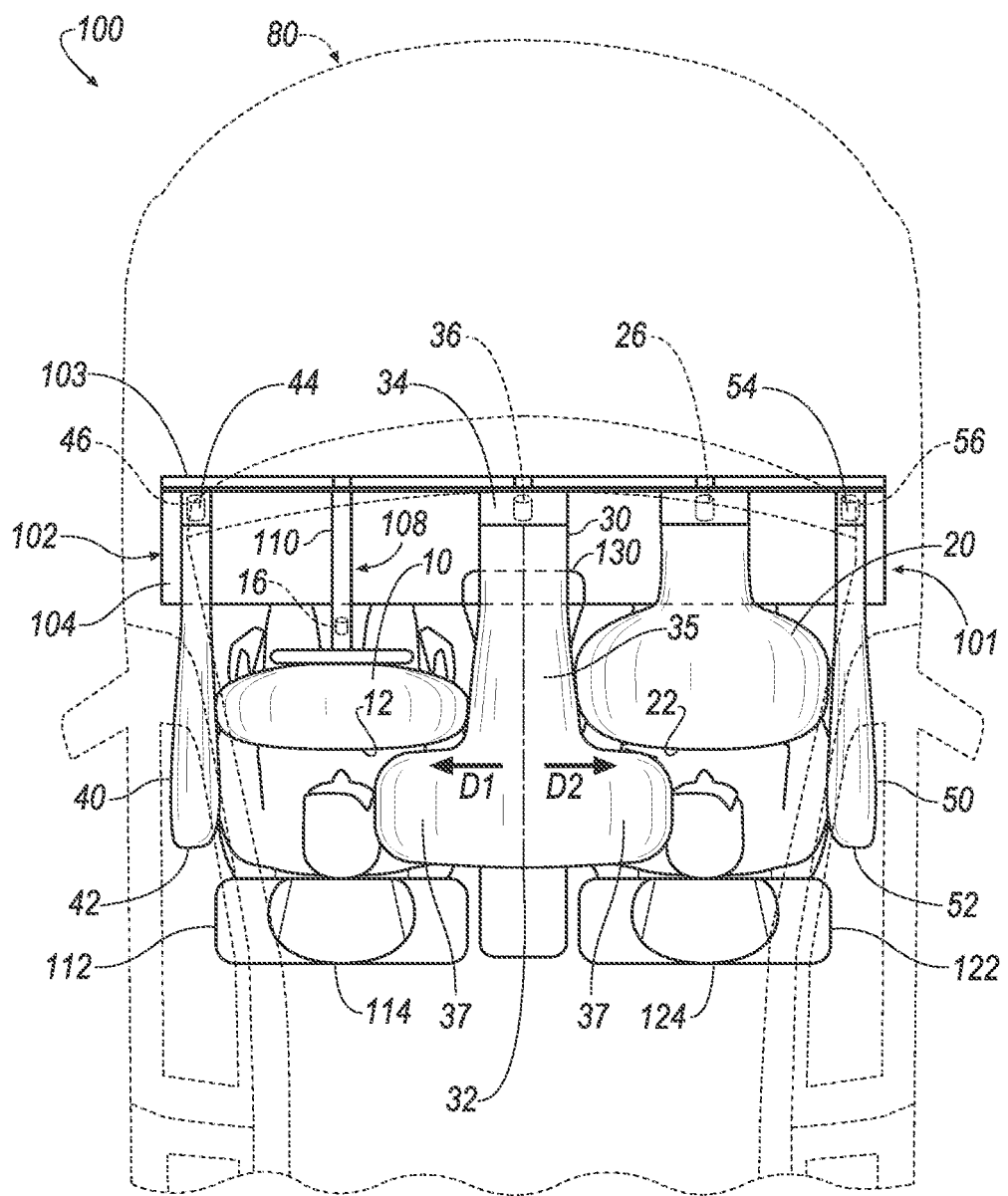
FIG. 2 is a plan view of the vehicle including the first embodiment of the impact absorbing system with the airbags of the impact absorbing system in an inflated position.

The extensions 37, 237, 337 extend from the base portion 35, 235 to receive the vehicle occupants during the impact. The extensions 37, 237, 337 may extend in a first direction D1 and a second direction D2, respectively when the intermediate airbag 30, 230, 330 is in the inflated position. For example, as shown in FIGS. 2 and 7, the first direction D1 may refer to the direction where the first airbag 10 is disposed relative to the intermediate airbag 30, 230, 330 and the second direction D2 may refer to the direction where the second airbag 20 is disposed relative to the intermediate airbag 30, 230, 330. In other words, the first direction D1 may extend in a vehicle-left direction and the second direction D2 may extend in a vehicle-right direction. Alternatively, the first direction D2 may refer to the direction where the second airbag 20 is disposed relative to the intermediate airbag 30, 230, 330, i.e., a vehicle-left direction, and the second direction D1 may refer to the direction where the first airbag 10 is disposed relative to the intermediate airbag 30, 230, 330, i.e., a vehicle-right direction. The terms "first" and "second" are used herein as identifiers are not used to indicate order or importance.

The extensions 37, 237, 337 may be substantially symmetric relative to the base portion 35, 235, as shown in the FIGS. 4-7. Alternatively, the extensions 37, 237, 337 may be any suitable shape and/or size, including asymmetric shapes and/or alignments with the base portion 35, 235.

The intermediate airbag 30, 230, 330 includes two extensions 37, 237, 337 in FIGS. 4-7, i.e., one extending in the first direction D1 and another extending in the second direction D2. Alternatively, the intermediate airbag 30, 230, 330 may include one extension 37, 237, 337 extending in one of the directions D1, D2. As another example, the intermediate airbag 30, 230, 330 may include more than two extensions 37, 237, 337.

The intermediate airbag 30, 230, 330 may include at least one extension 37, 237, 337 extending from the base portion 35, 235 in at least one of the first and second directions D1, D2. The extensions 37, 237, 337 may extend between the first airbag 10 and the first seat back 114, and may extend between the second airbag 20 and the second seat back 124.

As shown in FIG. 8, the intermediate airbag 30, 230, 330 includes a first panel 30a, 230a and a pair of side panels 30b, 230b. The first panel 30a, 230a includes a first end 30c, 230c and a second end 30d, 230d. The first end 30c, 230c and the second end 30d, 230d may be adjacent the frame 103. Specifically, the first end 30c, 230c and second end 30d, 230d may be attached to the intermediate box of the intermediate airbag module 34, 234. The side panels 30b, 230b may be attached to the first panel 30a, 230a via, e.g., stitching, adhesives, etc. The first panel 30a, 230a and the side panels 30b, 230b may be constructed of, e.g., fabric, a polymer, or any suitable material.

The main panel 30a, 230a includes a base 62, 262 and a pair of legs 64, 264. The legs 64, 264 are spaced from each other and extend from the base 62, 262 in a common direction in the inflated position, i.e., the base 62, 262 and legs 64, 264 form a U-shape when the intermediate airbag 30, 230, 330 is in the inflated position. The base 62, 262 extends forward relative to the instrument panel 102 when the intermediate airbag 30, 230, 330 is in the inflated position. In other words, the base 62, 262 is spaced from the instrument panel 102 and the legs 64, 264 extend from the instrument panel 102 to the base 62, 262 in the inflated position.

The side panels 30b, 20b are each connected to the main panel 30a, 230a along the base 62, 262 and the two legs 64, 264. In other words, the side panels 30b, 230b extend enclose the open sides of the U-shape formed by the base 62, 262 and legs 64, 264 of the main panel 30a, 230a. Since the main panel 30a, 230a forms the U-shape, and the side panels 30b, 230b enclose the sides of the U-shape, the intermediate airbag 30, 230, 330 may be formed to include the base portion 35, 235 and the extensions 37, 237, 337 with only three panels (i.e., the main panel 30a, 230a and two side panels 30b, 230b). This configuration simplifies design and manufacture of the intermediate airbag 30, 230, 330 by minimizing the seams between panels.

The base 62, 262 may be wider than the legs. Specifically, each leg 64, 264 includes a narrow portion 66, 266 and a wide portion 68, 268. The narrow portion 66, 266 is supported by the instrument panel 102 and is narrower than the base 62, 262. The narrow portion 66, 266 may be sized fit between the first and second airbags 10, 20 when the intermediate airbag 30, 230, 330 is in the inflated position, i.e., a width of the narrow portion 66, 266 may be smaller than a space between the first and second airbags 10, 20 in the inflated position.

The wide portion 68, 268 is attached to the base 62, 262 and extends from the base to the narrow portion 66. In the first embodiment of the intermediate airbag 30, as shown in FIGS. 2, 4-6, 8, and 10, the wide portion 68 may be substantially rectangular. For example, the wide portion 68 may include rounded corners, curvilinear sides, etc., that form a substantially rectangular shape. The wide portion 68 may be any suitable shape, including symmetric and asymmetric shapes.

In the second embodiment of the intermediate airbag 230, as shown in FIGS. 7, 9, and 11, the wide portion 268 may be substantially triangular. For example, the wide portion 268 may include rounded corners, curvilinear sides, etc., that form a substantially triangular shape. Said differently, the wide portion 268 may taper from the base 262 to the narrow portion 266. The wide portion 268 may be any suitable shape, including symmetric and asymmetric shapes.

In the third embodiment of the intermediate airbag 330, as shown in FIG. 12, the intermediate airbag 330 may include two extensions 337 extending in directions D1 and D2, respectively. The intermediate airbag 330 may have a central axis C extending from the instrument panel 101 to the end 32, and the intermediate airbag 330 may be asymmetric about the central axis C, as shown in FIG. 12. For example, the extensions 337 may have different shapes. For example, one of the extensions 337 may be substantially triangular, and the other of the extensions 337 may be substantially rectangular. Alternatively, for example, either of the extensions 337 may have any suitable shape.

When the intermediate airbag 30 is in the inflated position, the intermediate airbag 30 has an impact surface (not numbered) extending from the first airbag 10 to the second airbag 20. The impact surface absorbs energy from the occupants during vehicle impact when the occupants move in a manner that avoids all or part of the first and second airbags 10, 20, such as an oblique impact. The oblique impact forces the occupants to move laterally onto the impact surface.

As shown in FIGS. 2 and 4-7, the first side airbag 40 has an end 42 spaced distal from the instrument panel 102 and the second side airbag 50 has an end 52 spaced distal from the instrument panel 102. The ends 42, 52 of the first and second side airbags 40, 50 may extend farther into the vehicle 80 than the ends 12, 22 of the first and second airbags 10, 20. Alternatively, the end 12 of the first airbag 10 and/or the end 22 of the second airbag may extend farther into the vehicle 80 than the ends 42, 52 of the first and second side airbags 40, 50.

As shown in FIG. 4, during the oblique impact, the driver may move forward and to the right. The driver may directly hit or glance off of the first airbag 10, moving into the intermediate airbag 30, which absorbs energy from the driver. The passenger may directly hit or glance off of the second airbag 20, moving into the second side airbag 50.

Similarly, as shown in FIG. 5, during the oblique impact, the passenger may move forward and to the left. The passenger may directly hit or glance off of the second airbag 20, moving into the intermediate airbag 30, which absorbs energy from the passenger. The driver may directly hit or glance off of the first airbag 10, moving into the first side airbag 40.

As shown in FIG. 6, during a side impact, the passengers may move laterally, i.e., in a right or left cross-vehicle direction. In the event that the passenger moves toward the intermediate airbag 30, the passenger may impact the extension 37.

The impact absorbing system 100 of the vehicle 80 may include an impact sensor (not shown), and a controller (not shown) in communication with the inflators 16, 26, 36, 46, 56. Upon vehicle impact, the controller activates the inflators 16, 26, 36, 46, 56 to inflate the airbags 10, 20, 30, 230, 330, 40, 50.

The controller may be a microprocessor-based controller. The impact sensor is in communication with the controller to communicate data to the controller. The impact sensor may be of any suitable type, e.g., using accelerometers, radar, lidar, and/or a vision system. The vision system may include one or more cameras, CCD image sensors, and/or CMOS image sensors, etc.

The controller and the impact sensor may be connected to a communication bus (not shown), such as a controller area network (CAN) bus, of the vehicle 80. The controller may use the information from the communication bus to control the activation of the inflators 16, 26, 36, 46, 56. The inflators 16, 26, 36, 46, 56 may alternatively be connected to the communication bus directly.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An impact absorbing system comprising:
   an instrument panel; and
   a first airbag, a second airbag, and an intermediate airbag each supported by the instrument panel in an uninflated position and each being inflatable to an inflated position;
   the first airbag disposed in a first direction from the intermediate airbag;
   the intermediate airbag including a base portion between the first and second airbags and an extension extending from the base portion in the first direction in the inflated position, the first airbag being disposed between the extension and the instrument panel when the intermediate airbag and the first airbag are both in the inflated position.

2. The vehicle impact absorbing system of claim 1, the intermediate airbag being between the first and second airbags in the uninflated position.

3. The vehicle impact absorbing system of claim 1, wherein the intermediate airbag includes a first panel and a pair of side panels, wherein the first panel includes a base and two legs extending from the base of the first panel spaced from each other and supported by the instrument panel, and wherein the side panels are spaced from each other and are each connected to the first panel along the base of the first panel and the two legs.

4. The vehicle impact absorbing system of claim 3, wherein the legs include a narrow portion supported by the instrument panel and a wide portion connected to the base.

5. The vehicle impact absorbing system of claim 4, wherein the wide portion is at least one of substantially rectangular and substantially triangular.

6. The vehicle impact absorbing system of claim 1, wherein the intermediate airbag includes a central axis, the intermediate airbag being asymmetric about the central axis.

7. The vehicle impact absorbing system of claim 1, wherein the second airbag is disposed in a second direction from the intermediate airbag and the intermediate airbag includes a second extension extending from the base portion in the second direction in the inflated position.

8. The vehicle impact absorbing system of claim 1, further comprising a steering wheel supported by the instrument panel and supporting the first airbag, wherein the instrument panel includes a panel spaced from the steering wheel and covering the second airbag, and further comprising a control cluster between the steering wheel and the panel, wherein the intermediate airbag is disposed above the control cluster.

9. An impact absorbing system comprising:
   an instrument panel;
   a first seat back; and
   a first airbag, a second airbag, and an intermediate airbag each supported by the instrument panel in an uninflated position and each being inflatable to an inflated position;
   the intermediate airbag including a base portion between the first and second airbags and an extension extending from the base portion between the first airbag and the first seat back in the inflated position.

10. The system of claim 9, further comprising a second seat back, wherein the intermediate airbag includes a second extension extending from the base portion between the second airbag and the second seat back.

11. The system of claim 9, wherein the intermediate airbag includes a first panel and a pair of side panels, wherein the first panel includes a base and two legs extending from the base spaced from each other and supported by the instrument panel, and wherein the side panels are spaced from each other and are each connected to the first panel along the base and the two legs.

12. The system of claim 11, wherein the legs include a narrow portion supported by the instrument panel and a wide portion connected to the base.

13. The system of claim 12, wherein the wide portion is substantially rectangular.

14. The system of claim 12, wherein the wide portion is substantially triangular.

15. An instrument panel comprising:
   an instrument panel frame;
   a first airbag, a second airbag, and an intermediate airbag each supported by the frame in an uninflated position and each being inflatable to an inflated position;
   the first airbag disposed in a first direction from the intermediate airbag;
   the intermediate airbag including an end spaced distal relative to the instrument panel frame a base portion between the first and second airbags and an extension extending from the base portion in the first direction in the inflated position at the end of the intermediate airbag.

16. The instrument panel of claim 15, wherein the intermediate airbag includes a first panel and a pair of side panels, wherein the first panel includes a base and two legs extending from the base spaced from each other and supported by the frame, and wherein the side panels are spaced from each other and are each connected to the first panel along the base and the two legs.

17. The instrument panel of claim 16, wherein the legs include a narrow portion supported by the frame and a wide portion connected to the base.

18. The instrument panel of claim 17, wherein the wide portion is substantially rectangular.

19. The instrument panel of claim 17, wherein the wide portion is substantially triangular.

20. The instrument panel of claim 15, wherein the second airbag is disposed in a second direction from the intermediate airbag, the intermediate airbag including a second extension extending in the second direction.

* * * * *

UNITED STATES PATENT AND TRADEMARK OFFICE
CERTIFICATE OF CORRECTION

PATENT NO.          : 9,566,929 B1                            Page 1 of 1
APPLICATION NO.     : 14/969262
DATED               : February 14, 2017
INVENTOR(S)         : Belwafa et al.

It is certified that error appears in the above-identified patent and that said Letters Patent is hereby corrected as shown below:

In the Claims

Column 8, Line 56, Claim 15 replace "panel frame a base portion" with -- panel frame, a base portion --.

Column 8, Line 57, Claim 15 replace "second airbags and an extension" with -- second airbags, and an extension --.

Signed and Sealed this
Twenty-fifth Day of April, 2017

Michelle K. Lee
*Director of the United States Patent and Trademark Office*